Patented July 29, 1941

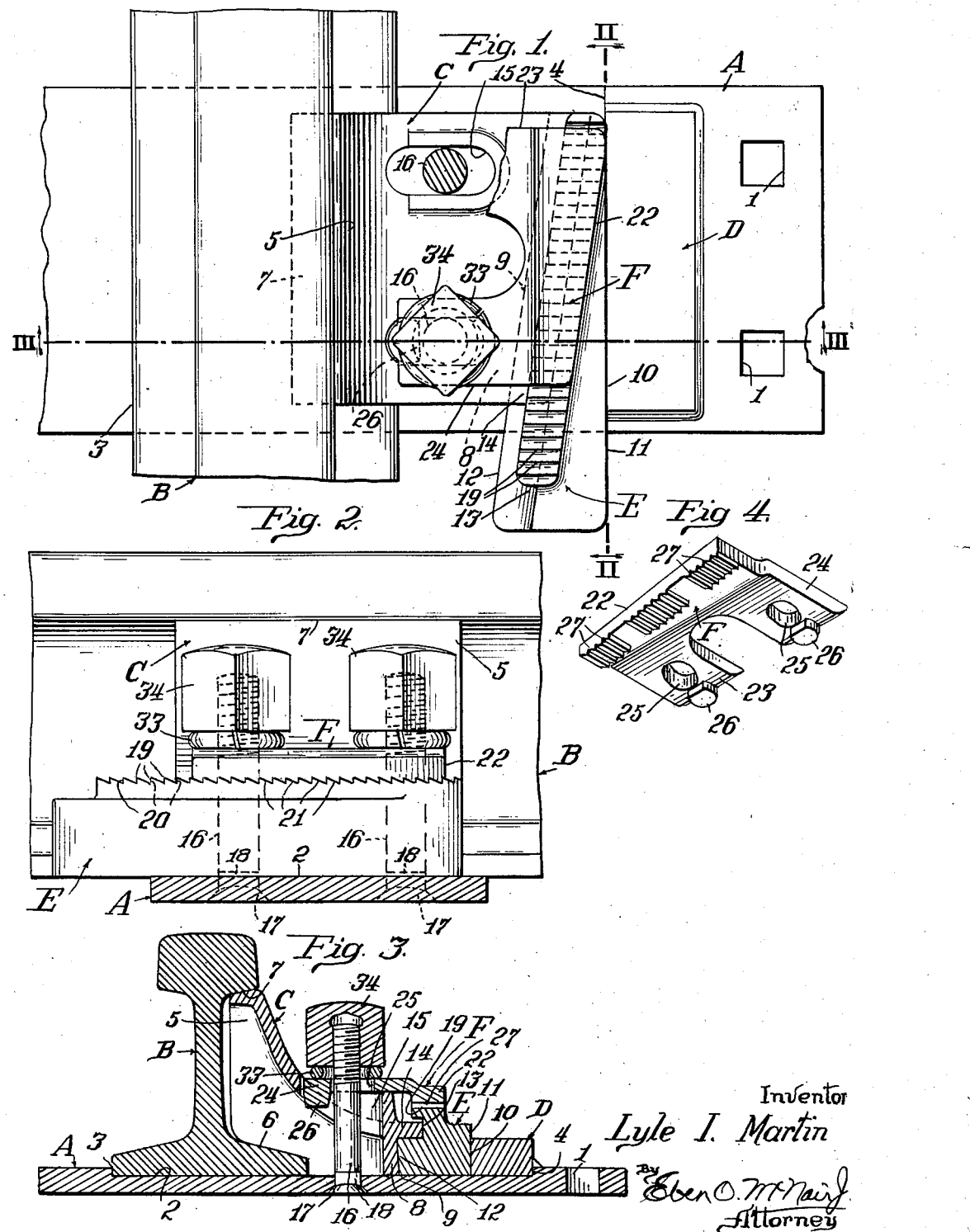

2,250,891

UNITED STATES PATENT OFFICE 2,250,891

RAIL BRACE

Lyle I. Martin, Chicago, Ill., assignor to Morden Frog & Crossing Works, Chicago, Ill., a corporation of Illinois Application September 11, 1940, Serial No. 356,343

2 Claims. (Cl. 238—292)

The present invention relates to rail braces of the type utilizing an endwise movable wedge for retaining the rail brace member in tight engagement with a rail to maintain the alignment of the rail, and is directed more particularly to novel means for retaining the wedge in adjusted position.

The rail brace structure of the present invention is heavy, durable, and designed to withstand the shocks of modern high speed traffic. It is particularly adapted for use in split switches as well as slip switches used in interlocking switch areas where it is highly essential to hold the track rails to proper gauge and alignment. Furthermore, it is very useful for supporting guard rails in both tangent and curved tracks where the severe thrust of heavy high speed traffic is exerted directly against the guard rails.

The rail brace structure is simple in construction and can be readily installed, adjusted and replaced, without disturbing the rail, tie or plate.

The abutment face is at right angles to the brace and parallel to the rail, so in the event the fastenings loosen, there is no tendency of the brace member to back away from the rail.

An object of the present invention is to provide novel means for locking a wedge against displacement, in a rail brace structure, from a selected adjusted position, which means are simple in construction and use, and which are highly effective for the purpose intended, while at the same time reducing the number of parts to a minimum.

Another object of the invention is to provide a washer member which serves a double purpose of a cover or protection for a bolt slot in the brace member, and which interlocks with the wedge, when the bolt means are tightened, to retain the wedge in position.

A further object of the present invention is to provide, in a rail brace device, a cover washer member so constructed and used as to cause the member to interlock with the wedge when the nuts on the bolts are tightened, the tightening of the nuts on the bolts constituting the sole means for securing the brace member in place and the wedge locked against accidental movement from an adjusted position.

A still further object of the invention is to provide, in a rail brace structure, a cover washer member having a portion of sufficient extent to overlie and cover the bolt slot in a brace member and having a part overlying the wedge, the confronting surfaces of the wedge and the overlying part of the washer member being serrated or otherwise provided with interlocking means which interlock when a bolt nut is tightened against the washer member to secure the brace member in place against the rail, the cover washer preventing entry of foreign matter into the bolt slot.

Another and still further object of the present invention is to provide, in a rail brace device, a cover washer for a bolt slot in the brace member which prevents entry of corrosive matter into the slot, thus preventing ruination of the bolt.

The invention has for a further object, in a rail brace structure, the provision of a single instrumentality which functions to cover bolt slots and also interlocks with the wedge to retain it in adjusted position.

The invention has for an additional object a novel tooth construction of washer and wedge to afford maximum surface engagement in locked position and to prevent accidental retrogression of the wedge, in the event the brace fastenings loosen in service.

The above, other and further objects of the present invention, will be apparent from the following description and accompanying drawing.

The accompanying drawing illustrates a rail brace structure in which the present invention is utilized and the views thereof are as follows:

Figure 1 is a plan view of a rail brace structure with a part broken away, and showing a fragmental portion of a rail, illustrating and embodying the principles of the present invention.

Figure 2 is a section taken on line II—II of Figure 1.

Figure 3 is a section taken on line III—III of Figure 1.

Figure 4 is a perspective view of a double cover washer member showing the under surface of the same and illustrating the construction of the serrations or teeth.

The drawing will now be explained.

The device, as herein illustrated, includes a base or tie plate A adapted to be fastened to a tie and held thereon by spikes or bolts (not shown) through suitable spike openings 1 in the plate. A portion of a rail B rests on the plate and is the rail to be braced by the device.

The plate A is illustrated as formed with a recess 2 in its upper surface, forming shoulders 3 and 4. The rail rests on the bottom of the recess and against the shoulder 3.

Against the other shoulder 4, an abutment D is secured, as by welding, soldering or riveting. It is to be understood that the abutment might be formed as an integral part of the plate, if so desired.

A rail brace member C, formed as a casting usually, has an upstanding part 5 which lies along, but is spaced from, the rail web. The brace member C has bearing at 6 against the upper surface of the rail base or flange, and another bearing at 7 against the under side of the rail head. The rail brace member has a tail portion 8 which makes bearing with the bottom of the recess 2 between the rail and the abutment. This tail piece is formed with an angular margin 9 with respect to the vertical face 10 of the abutment, and when the parts are in normal position, is spaced from the abutment. The face 10 of the abutment 10 is the wedge engaging face and extends across the plate A at right angles to the plate length and parallel to the rail B.

A wedge E is disposed between the abutment D and a margin 9 of the brace member C. The wedge has a flat face 11 in contact with the face 10 of the abutment and has another face 12 in contact with the margin 9 of the brace member. As may be observed in Figure 1, the margin 12 of the wedge is inclined with respect to the face 11 of the wedge.

The wedge member E is provided with a laterally extending inwardly directed recess 13 which receives a tongue 14 on the brace member C. The purpose of this construction is to prevent loss of the wedge when the bolts are loosened.

The brace member C is formed with elongated bolt-receiving slots 15, two of which are shown in the drawing. The length of these slots is at right angles to the length of the rail B, so that movement of the base member C on the plate A is constrained to straight line movement at right angles to the rail.

Extending upwardly through the plate A and the slots 15, are bolts 16. These bolts are shown as having flat heads entered in suitable countersunk portions 17 in the under surface of the plate. To prevent rotative movement of the bolts when tightening or loosening the nuts, the shanks of the bolts adjacent the heads are preferably formed with polygonal portions 18 which fit correspondingly shaped apertures in the plate.

The wedge member E is on its upper surface provided with a face having a plurality of serrations or teeth 19 formed in it, which teeth extend substantially transversely of the length of the wedge. As may be observed in Figure 2, the teeth or serrations are not of the usual or V-shape, but are of saw-tooth shape having the planes of their active faces 20 perpendicular to and substantially transversely of the directional movement of the wedge. The inactive faces 21 of the teeth or serrations are inclined as shown.

The rail brace structure is illustrated as having two bolts for holding it in place.

The novel cover washer member F of the present invention is illustrated in Fig. 4.

The cover washer member F is a unitary structure, substantially U-shape in plan, and comprises a head portion 22 and two laterally projecting arms 23 and 24 extending from one side of the head. The arms are apertured as at 25 to receive the bolts 16 when the cover member is in place. So that the cover member may seat properly against the margins of the slots 15, the apertures 25 are made slightly larger than the bolt diameters. The ends of the arms are provided with bosses 26 which enter the ends of the slots 15 adjacent the rail. These bosses cooperate with the bolts to maintain the cover member against any undue swinging movement of the same on the brace member when the bolts are loose and adjustment of the wedge is being made.

Along the margin of the head, and the under side thereof, are teeth or serrations 27 of the same contour and arrangement as described with reference to the teeth on the wedge member, but in reverse order, so that the active faces of the teeth on the cover member will engage the active faces 20 of the teeth on the wedge member to hold the wedge member in adjusted position and prevent shifting of the wedge member, should the bolts be loosened while the teeth of the cover member and wedge are still in engagement.

The head portion 22, when in place, extends generally in the direction of the length of the wedge E.

In order to compensate for any distortion which might occur in a cover member incidental to its manufacture, the serrations or teeth may be arranged in spaced groups, as clearly shown in Figure 4. This is to assure positive holding engagement between the cover member and wedge, even though the cover member be slightly warped.

Figure 1 illustrates the double cover washer member of Figure 4 in place; however, one of the arms is shown as broken away to show the relationship of the bolt 16 and its slot 15.

Lock washers 33 are applied about the bolts 15 after a cover washer member has been assembled, the nuts 34, here shown as solid pieces counterbored and tapped, are threaded onto the upper ends of the bolts, where, by a suitable wrench, they may be tightened to hold the brace member C against the rail B and to lock the cover member with the wedge, thus securing the structure in adjusted position.

In operation, let it be assumed that the rail B has been forced out of alignment, or that wear has occurred between the rail and the brace member C, requiring adjustment. A track man with his wrench loosens the nuts 34, without removing them from the bolts, a sufficient amount so that the serrations or teeth of the cover member and wedge may be disengaged, whereupon the wedge is then driven in a direction to force the brace member against the rail to realign the rail and to hold the brace member tightly against it. When this adjustment has been secured, the nuts are tightened, thus maintaining the brace member in proper position and locking the wedge against movement in a direction to relieve its pressure against the brace member. Inasmuch as it is unnecessary to remove the nuts to effect adjustment of the wedge, there is no chance of anything being lost.

In order to afford full bearing of the wedge against the plate A, the wedge is made longer than the width of the plate, so that no matter what the adjusted position of the wedge may be, there will be full bearing between it and the width of the plate.

The shape or contour of the teeth or serrations formed in the under surface of the cover washer head and on the wedge, afford vertical bearing between the engaged teeth when the wedge is locked in place. Consequently, vibratory forces applied to the brace structure in service will not accidentally dislodge the interlocked parts, as such vibratory forces are not sufficient to loosen the nuts to any extent where the engaged teeth will become fully separated.

The invention has been described herein more or less precisely as to details, yet it is to be understood that the invention is not to be limited thereby, as changes may be made in the arrangement and proportion of parts, and equivalents may be substituted without departing from the spirit and scope of the invention.

The invention is claimed as follows:

1. A rail brace device of the type wherein a rail is supported on a plate, with a brace member on the plate and against the rail, with an abutment on the plate, with a wedge between the abutment and brace member movable transversely of the plate to hold the brace member against the rail and having teeth on its upper face; that improvement which consists of a cover member for locking the wedge in adjusted position with respect to the brace member, said cover member comprising a unitary structure substantially U-shaped in plan having a head portion overlying and extending generally along the length of the wedge, the under surface of said portion having teeth to interlock with the wedge teeth to prevent relative movement of said wedge and said portion in the direction of their lengths, said cover member also having two laterally spaced parallel arms projecting from the same side of said head portion and overlying the brace member, the confronting surfaces of said arms and brace member being toothless throughout the lengths of the arms, the arms and the underlying part of the brace member being apertured to receive bolts, a bolt extending through one brace member aperture and the aperture in one arm, and another bolt extending through the other brace member aperture and the aperture in the other arm, and nuts on the bolts to be tightened to hold the several parts in place.

2. A device as recited in claim 1 in which the teeth of said head are arranged in spaced groups to afford holding engagement of said head and wedge should the cover member be slightly warped.

LYLE I. MARTIN.